United States Patent
Motowaki (10) Patent No.: US 10,730,706 B2
(45) Date of Patent: Aug. 4, 2020

(54) HAND FOR CONNECTOR CONNECTION AND HAND SYSTEM

(71) Applicant: Fanuc Corporation, Yamanashi (JP)

(72) Inventor: Yoshio Motowaki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/390,860

(22) Filed: Apr. 22, 2019

(65) Prior Publication Data

US 2019/0382214 A1    Dec. 19, 2019

(30) Foreign Application Priority Data

Jun. 15, 2018 (JP) ................. 2018-114094

(51) Int. Cl.
*B65G 47/91* (2006.01)
*B25J 15/06* (2006.01)
*B25J 15/08* (2006.01)

(52) U.S. Cl.
CPC .......... *B65G 47/91* (2013.01); *B25J 15/0616* (2013.01); *B25J 15/08* (2013.01)

(58) Field of Classification Search
CPC ........ B65G 47/91; B25J 15/0616; B25J 15/08
See application file for complete search history.

(56) References Cited

U.S. PATENT DOCUMENTS

| | | | | |
|---|---|---|---|---|
| 4,796,357 A * | 1/1989 | Smith | ................. | H05K 13/0413 29/840 |
| 6,584,670 B2 * | 7/2003 | Costa | ..................... | H01R 43/16 228/103 |
| 8,303,008 B2 * | 11/2012 | Jeserer | ............... | G01R 31/2874 294/185 |
| 8,550,524 B2 * | 10/2013 | Yeh | ........................ | B25B 11/007 294/183 |
| 9,138,899 B2 * | 9/2015 | Gong | .................... | B25J 15/0616 294/183 |
| 2002/0185875 A1 * | 12/2002 | Kim | ................... | H05K 13/0413 294/183 |

(Continued)

FOREIGN PATENT DOCUMENTS

| | | |
|---|---|---|
| EP | 3476547 A1 | 5/2019 |
| JP | H11-121991 A | 4/1999 |

(Continued)

OTHER PUBLICATIONS

Ishikawa, Kaoru; Notice of Reasons for Refusal; Japanese Patent Application No. 2018-114094; dated Jun 11, 2020; 3 pages.

*Primary Examiner* — Stephen A Vu
(74) *Attorney, Agent, or Firm* — Ross T. Robinson (57) ABSTRACT

A hand for connector connection that grips a component including a main body component, a flexible board extending from the main body component, and a first connector disposed on the flexible board and connects the first connector to a second connector of a mount substrate includes a first gripping section that grips the main body component and a second gripping section that grips the first connector. The second gripping section includes a close contact surface brought into close contact with a back surface of the first connector and a suction pad that starts suction of the back surface of the first connector in a position further projecting than the close contact surface and is contracted to a position where the suction pad is disposed flush with the close contact surface in a sucked state.

7 Claims, 11 Drawing Sheets

(56) References Cited

U.S. PATENT DOCUMENTS

| | | |
|---|---|---|
| 2009/0011634 A1 | 1/2009 | Tsukumo |
| 2019/0160673 A1 | 5/2019 | Hirata et al. |

FOREIGN PATENT DOCUMENTS

| | | |
|---|---|---|
| JP | 2007-035308 A | 2/2007 |
| JP | 2007-276065 A | 10/2007 |
| JP | 2009-016266 A | 1/2009 |
| JP | 2010-003616 A | 1/2010 |
| JP | 2012-094444 A | 5/2012 |
| JP | 2017-226062 A | 12/2017 |

* cited by examiner

HAND FOR CONNECTOR CONNECTION AND HAND SYSTEM

CROSS-REFERENCE TO RELATED APPLICATIONS

This application claims the benefit of Japanese Patent Application No. 2018-114094, the content of which is incorporated herein by reference.

TECHNICAL FIELD

The present invention relates to a hand for connector connection and a hand system.

BACKGROUND ART

As work for mounting, on a substrate, a component including a main body component, a flexible board extending from the main body component, and an ultra-small connector fixed to the flexible board, work for performing positioning of the main body component after connecting the connector fixed to the flexible board to a connector provided on the substrate has been manually performed.

SUMMARY OF INVENTION

An aspect of the present invention is a hand for connector connection, which grips a component including a main body component, a flexible board extending from the main body component, and a first connector disposed on the flexible board and connects the first connector to a second connector of a mount substrate. The hand for connector connection includes: a first gripping section that grips the main body component; and a second gripping section that grips the first connector. The second gripping section includes: a close contact surface brought into close contact with a back surface of the first connector; and a suction pad that starts suction of the back surface of the first connector in a position further projecting than the close contact surface and is contracted to a position where the suction pad is disposed flush with the close contact surface in a sucked state.

DESCRIPTION OF EMBODIMENTS

A hand for connector connection 2 and a hand system 1 according to a first embodiment of the present invention are explained below with reference to the drawings.

Figure 1:
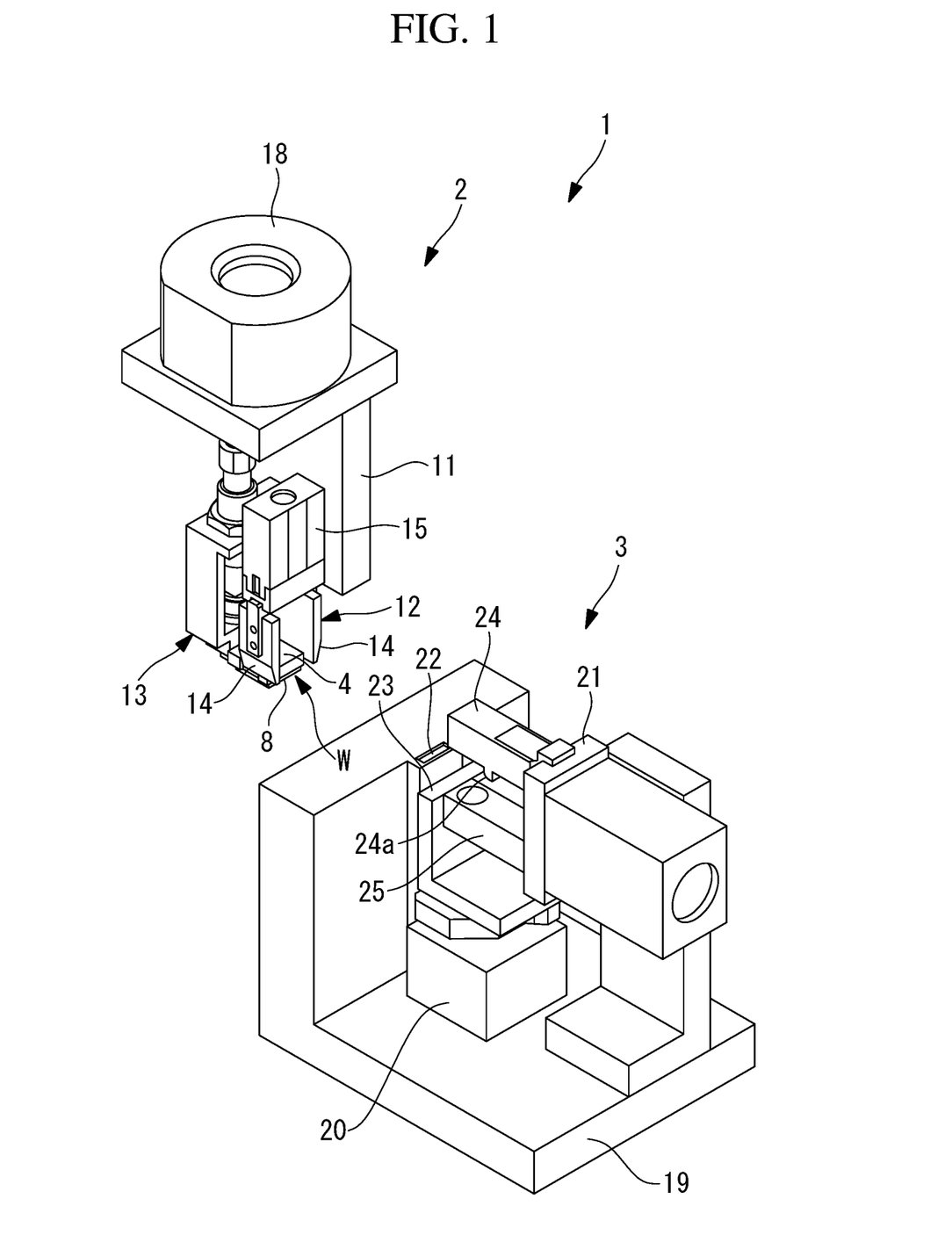
FIG. 1 is a perspective view showing a hand system according to a first embodiment of the present invention.

The hand system 1 according to this embodiment includes, as shown in FIG. 1, a hand for connector connection (hereinafter referred to as hand main body as well) 2 attached to the distal end of a robot and a jig for positioning 3 set near the robot.

Figure 2:
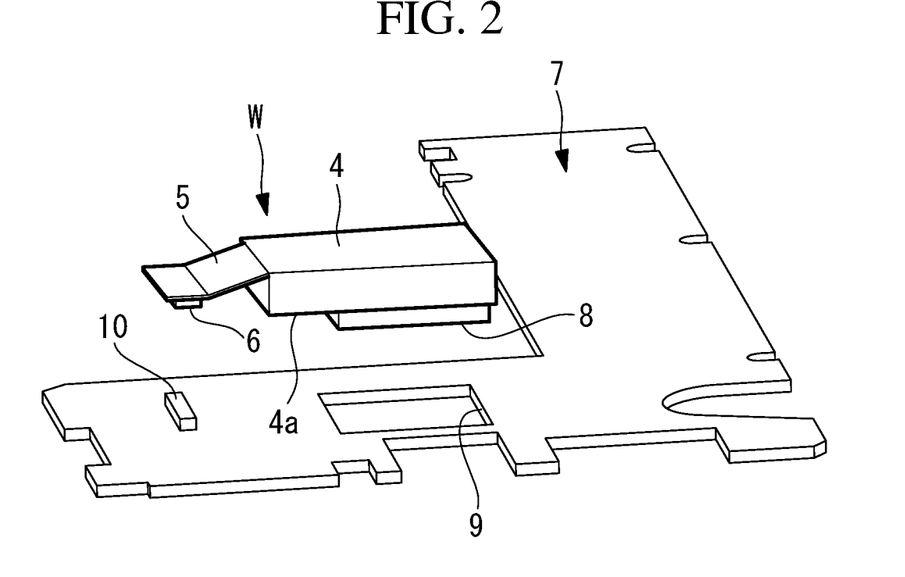
FIG. 2 is a perspective view showing an example of work handled by the hand system shown in FIG. 1 and a mount substrate on which the work is mounted.
Figure 3:
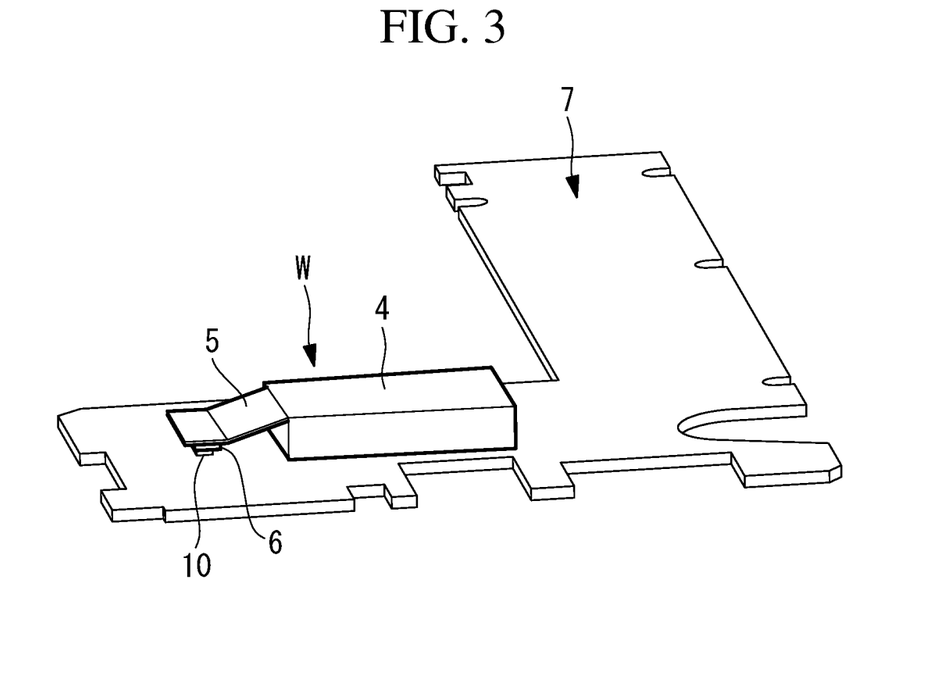
FIG. 3 is a perspective view showing a state in which the work shown in FIG. 2 is mounted on the mount substrate.

The hand system 1 according to this embodiment is a system that grips work (a component) W including a main body component 4 formed in a flat shape, a belt-like flexible board 5 extending from the main body component 4, and a first connector 6 disposed on the flexible board 5 as shown in FIG. 2 and FIG. 3 and mounts the work W on a mount substrate 7 fixed on the outside. The main body component 4 has a rectangular parallelepiped shape. A projection 8 for mounting on the mount substrate 7 is provided on one surface (a mounting surface) 4a in the thickness direction of the main body component 4.

One end of the flexible board 5 is fixed to one side surface of the main body component 4 in a form in which the one end can be displaced in parallel to the mounting surface 4a.

The first connector 6 is disposed on the surface on the mounting surface 4a side of the flexible board 5.

On the mount substrate 7, as shown in FIG. 2, a hole 9 in which the projection 8 of the main body component 4 is fit and a second connector 10 to which the first connector 6 is connected are disposed side by side. The distance between the hole 9 and the second connector 10 is set shorter than the distance between the projection 8 of the main body component 4 and the first connector 6. The mount substrate 7 has structure for mounting the work W in a state in which the flexible board 5 is slightly bent. The mount substrate 7 is set to face the second connector 10 upward and the work W with the first connector 6 faced downward is pressed down in the vertical downward direction, whereby the first connector 6 can be connected to the second connector 10.

Figure 4:
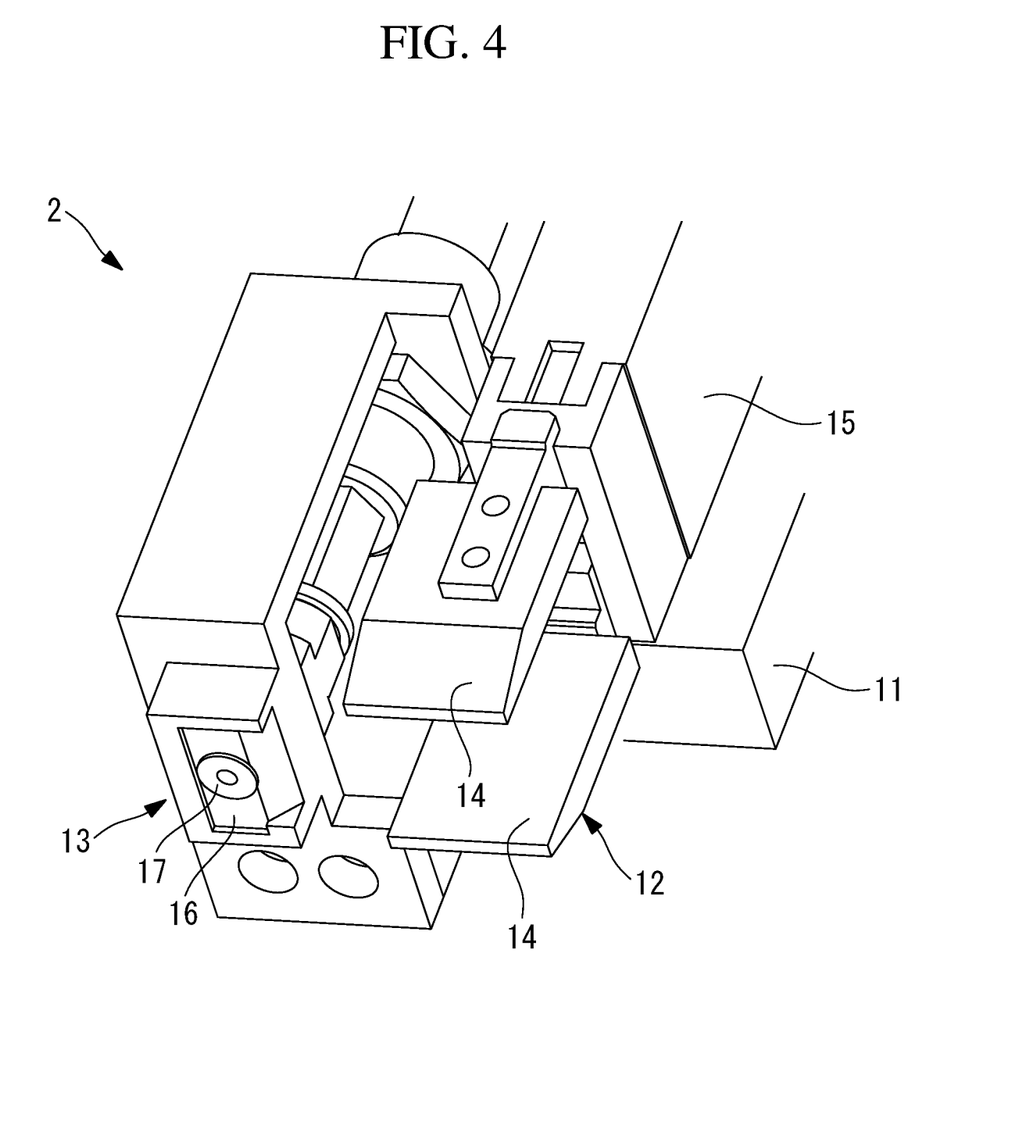
FIG. 4 is a perspective view showing a gripping section and a sucking section of a hand main body of the hand system shown in FIG. 1.

The hand main body 2 includes, as shown in FIG. 4, a hand base 11 and a gripping section (a first gripping section) 12 and a sucking section (a second gripping section) 13 fixed to the hand base 11. The gripping section 12 includes two claw sections 14 disposed to be opposed to each other and a cylinder 15 capable of adjusting the interval between the claw sections 14. The gripping section 12 clamps and grips the main body component 4 in the width direction.

Figure 5:
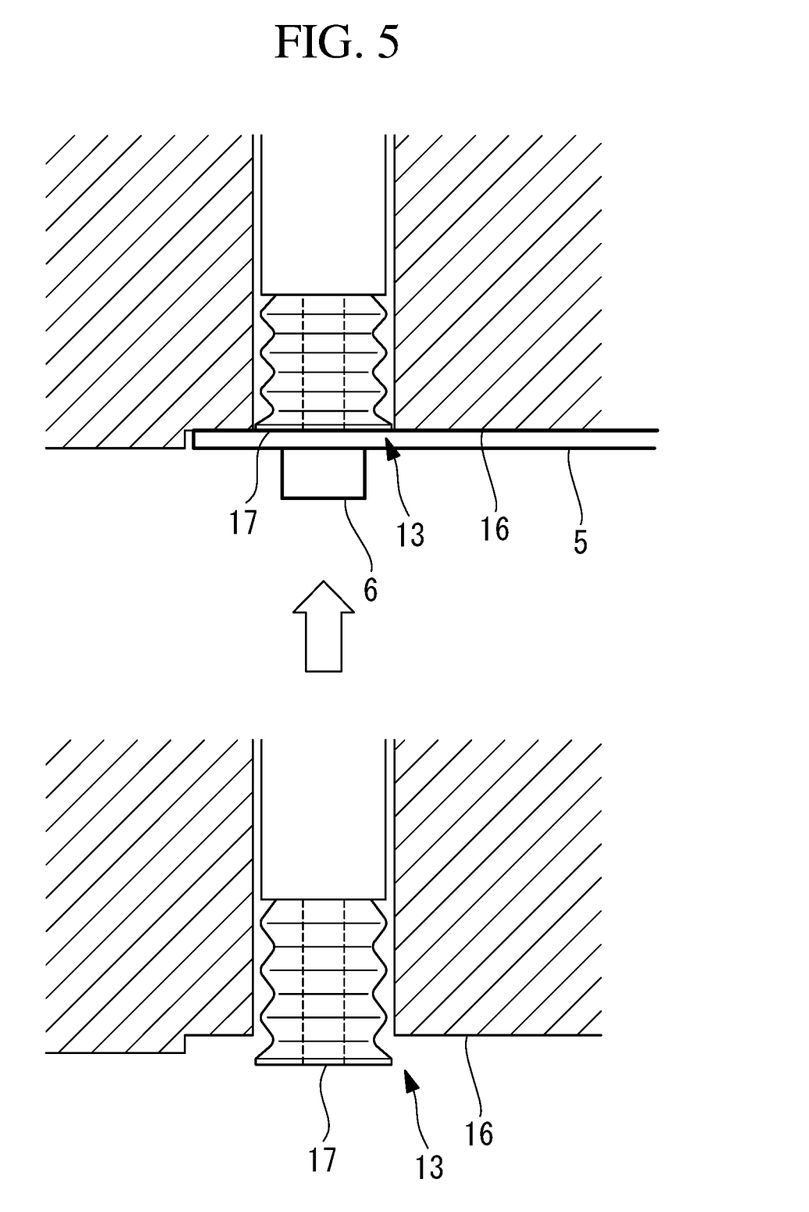
FIG. 5 is a longitudinal sectional view for explaining the operation of the sucking section shown in FIG. 4.

The sucking section 13 includes, as shown in FIG. 5, a close contact surface 16 brought into close contact with the surface of the flexible board 5 on the back surface side of the first connector 6 and a suction pad 17 that starts suction of the surface of the flexible board 5 on the back surface side of the first connector 6 in a position further projecting than the close contact surface 16 and is contracted to a position where the suction pad 17 is disposed flush with the close contact surface 16 in a sucked state. The suction pad 17 is configured of an elastic body such as rubber. The close contact surface 16 is configured of, for example, a metal material having higher rigidity than the suction pad 17.

As shown in FIG. 1, a mounting section 18 detachably mounted by an ATC (AUTO TOOL CHANGER) attached to the distal end of the robot is fixed to the hand base 11. By mounting the mounting section 18 with the ACT attached to the robot, a positive pressure from the robot side to the cylinder 15 and a negative pressure to the sucking section 13 are supplied.

The jig for positioning 3 is a jig for causing the hand main body 2 to grip the work W in a state in which a positional relation between the main body component 4 of the work W and the first connector 6 is adjusted to a positional relation in a mounted state on the mount substrate 7.

The jig for positioning 3 includes a jig base 19 set on the outside and a cylinder for push-up (a second positioning section) 20 and a parallel chuck (the second positioning section) 21 attached to the jig base 19.

A connector positioning recess (a first positioning section) 22 opened upward in which the first connector 6 brought close from an upward direction is fit is provided on the upper surface of the jig base 19.

The cylinder for push-up 20 includes a pressing section 23 capable of advancing and retracting in the vertical upward direction in a position where the mounting surface 4a on the flexible board 5 side of the main body component 4 of the work W, the first connector 6 of which is fit in the connector positioning recess 22, is pushed upward. When the mounting surface 4a on the flexible board 5 side is pushed upward, movement of the side surface (the front side surface) on the flexible board 5 side is restrained by the flexible board 5. Therefore, the main body component 4 is inclined to a posture in which the side surface (the rear side surface) on the opposite side of the flexible board 5 is lifted.

The parallel chuck 21 includes two claws 24 and 25 opened and closed in the up-down direction. The parallel chuck 21 is disposed in a position where the main body component 4 disposed between the claws 24 and 25 can be clamped in the thickness direction. An inclined surface 24a in contact with the lifted rear side surface is provided on the lower surface of the claw 24 on the upper side. The lifted rear side surface of the main body component 4 is moved along the inclined surface 24a to thereby bend the flexible board 5 and adjust a positional relation between the first connector 6 and the main body component 4 to a positional relation during mounting on the mount substrate 7.

The operation of the hand system 1 according to this embodiment configured in this way is explained below.

To mount the work W on the mount substrate 7 using the hand system 1 according to this embodiment, first, the position and the posture of the work W with the first connector 6 faced downward are acquired by a not-shown camera, the robot is operated to thereby bring the hand main body 2 close to the work W, the main body component 4 is clamped by the two claw sections 14 in the width direction, and thereafter the back surface of the first connector 6 is sucked by the sucking section 13.

The sucking section 13 is sucked to the surface of the flexible board 5, whereby the suction pad 17 is contracted by a negative pressure and retracted to a position where the suction pad 17 is flush with the close contact surface 16 provided in the sucking section 13. Therefore, the surface of the flexible board 5 is brought into close contact with the close contact surface 16.

Both of the main body component 4 and the first connector 6 are not gripped in the width direction and the first connector 6 is sucked. Therefore, even if an error is present in outer diameter dimensions of the main body component 4 and the first connector 6, it is possible to prevent, based on the error, an external force from acting in the width direction of the flexible board 5. It is possible to maintain the flexible board 5 in a sound state.

Figure 6:
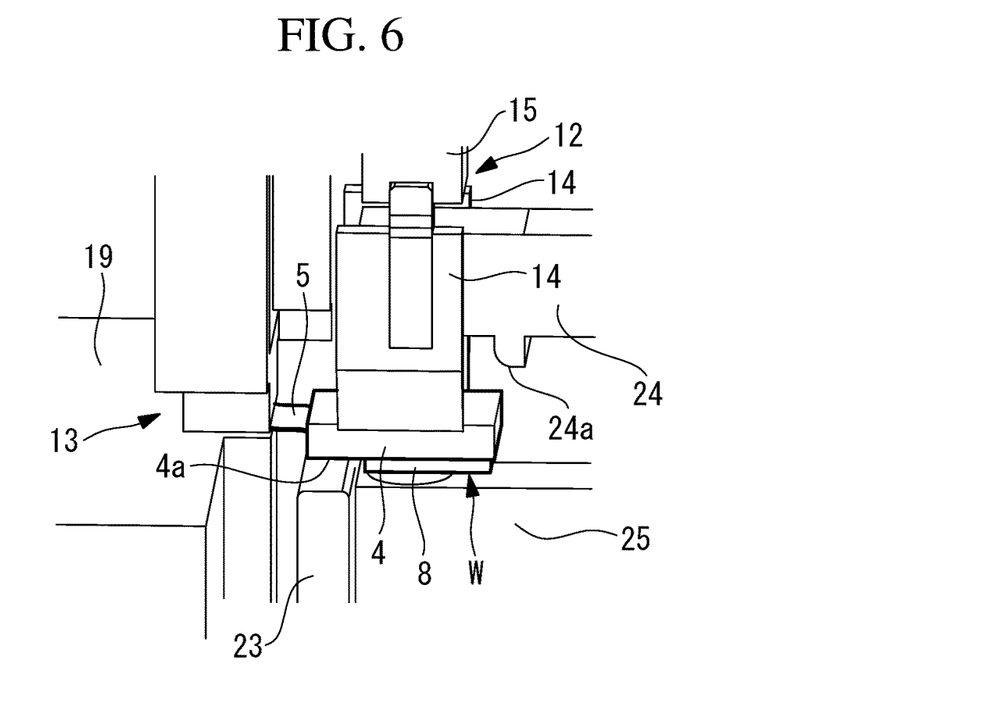
FIG. 6 is a perspective view for explaining operation for positioning the work on the hand main body in the hand system shown in FIG. 1.

In this state, the robot is operated to move the hand main body 2 to above the jig for positioning 3. As shown in FIG. 6, the first connector 6 held by the sucking section 13 is faced downward and fit in the connector positioning recess 22 provided on the jig base 19 of the jig for positioning 3. At this time, the main body component 4 is disposed between the two claws 24 and 25 of the parallel chuck 21.

When the first connector 6 is fit in the connector positioning recess 22, the flexible board 5 is clamped between the jig base 19 and the close contact surface 16 of the sucking section 13 of the hand main body 2. Therefore, even if a gripped state by the gripping section 12 is released, a drop of the work W is prevented.

Figure 7:
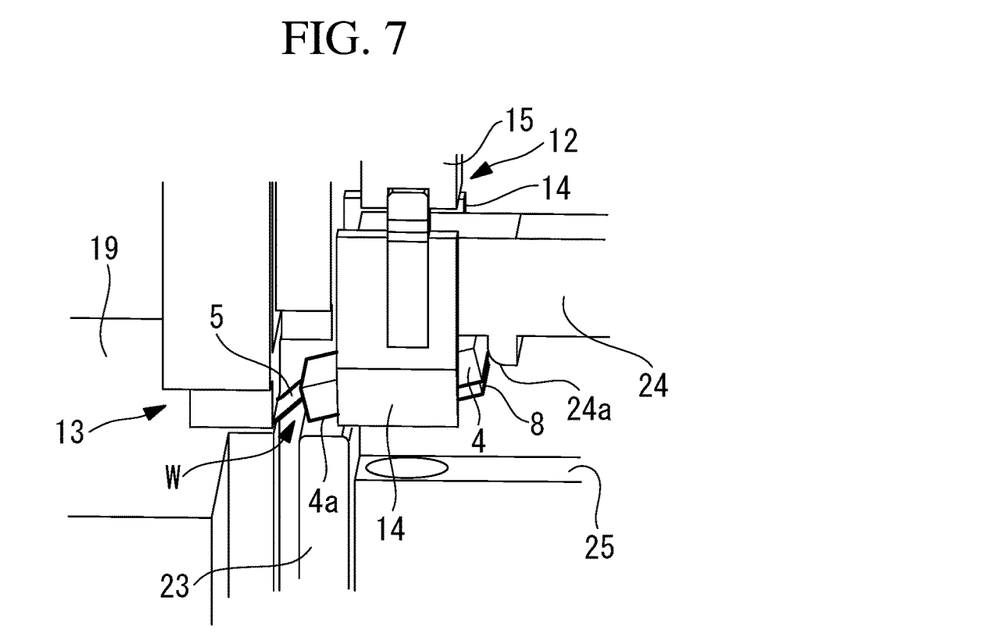
FIG. 7 is a perspective view for explaining the operation for positioning the work on the hand main body following FIG. 6.

In this state, as shown in FIG. 7, when the cylinder for push-up 20 provided on the jig base 19 is actuated and the main body component 4 is pushed up by the pressing section 23, the main body component 4 inclines and the rear side surface is lifted.

Figure 8:
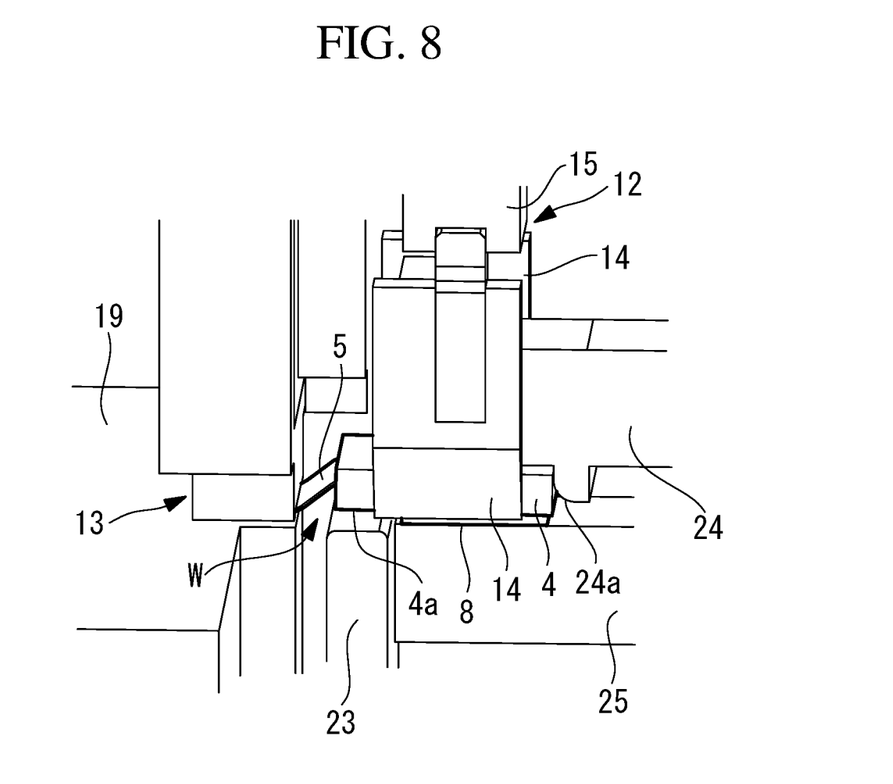
FIG. 8 is a perspective view for explaining the operation for positioning the work on the hand main body following FIG. 7.

When the parallel chuck 21 is actuated in this state to narrow the interval between the claws 24 and 25, the rear side surface comes into contact with the inclined surface 24a provided on the claw 24 on the upper side. The main body component 4 is pressed to the flexible board 5 side by the inclined surface 24a according to a closing motion of the parallel chuck 21. The distance from the first connector 6 to the rear side surface is set to a predetermined dimension in a position where the main body component 4 is clamped between the two claws 24 and 25 in the thickness direction by closing the two claws 24 and 25 of the parallel chuck 21 as shown in FIG. 8.

Figure 9:
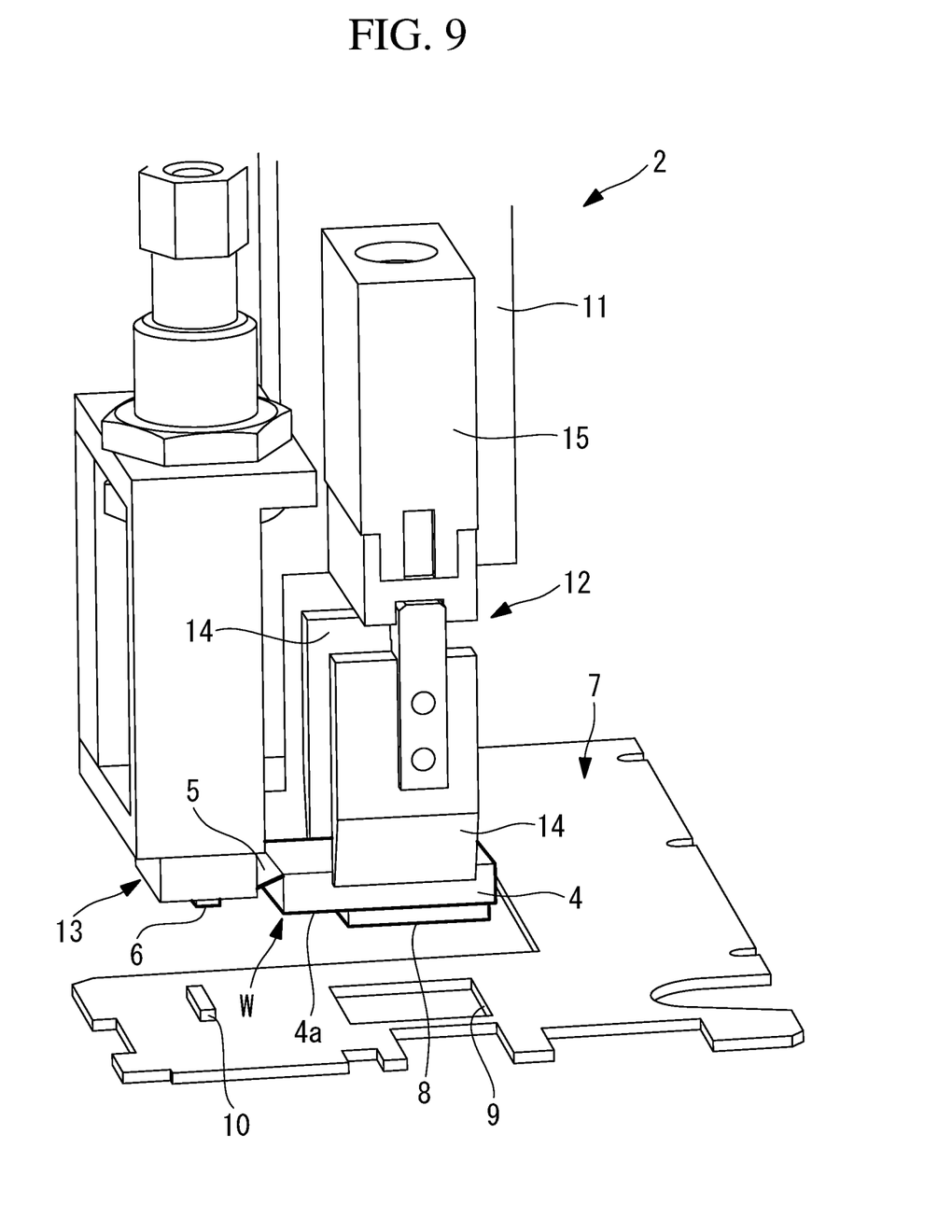
FIG. 9 is a perspective view for explaining a state in which the work positioned in FIG. 8 is moved toward the mount substrate by the hand main body.

In this state, the cylinder 15 of the gripping section 12 is actuated to grip the main body component 4 in a state in which the main body component 4 is clamped between the two claw sections 14 in the width direction. Consequently, the work W including the flexible board 5 is gripped by the hand main body 2 in a mounted form on the mount substrate 7. Therefore, the robot is actuated to convey the work W to the mount substrate 7 as shown in FIG. 9. As shown in FIG. 2 and FIG. 3, the first connector 6 is pressed against and connected to the second connector 10 of the mount substrate 7 while fitting the projection 8 of the main body component 4 in the hole 9 of the mount substrate 7.

In this case, with the hand system 1 according to this embodiment, the sucking section 13 does not support the first connector 6 with the suction pad 17 having elasticity. The first connector 6 is supported by contracting the suction pad 17 and bringing the flexible board 5 on the back surface side of the first connector 6 into close contact with the close contact surface 16 having higher rigidity than the suction pad 17. Therefore, during the connection of the first connector 6 to the second connector 10 by the robot, it is possible to accurately detect, with a force sensor incorporated in the robot, a pressing force acting on the first connector 6. As a result, there is an advantage that it is possible to facilitate connection work of the connectors 6 and 10 by the robot and easily connect the work W to the mount substrate 7.

Note that, in this embodiment, a curved inclined surface is used as the inclined surface 24a. However, a flat inclined surface may be adopted instead of the curved inclined surface.

A hand for connector connection 32 according to a second embodiment of the present invention is explained below with reference to the drawings.

The hand for connector connection 32 according to this embodiment is imparted with the function of the jig for positioning 3 of the hand system 1 explained above.

Figure 10:
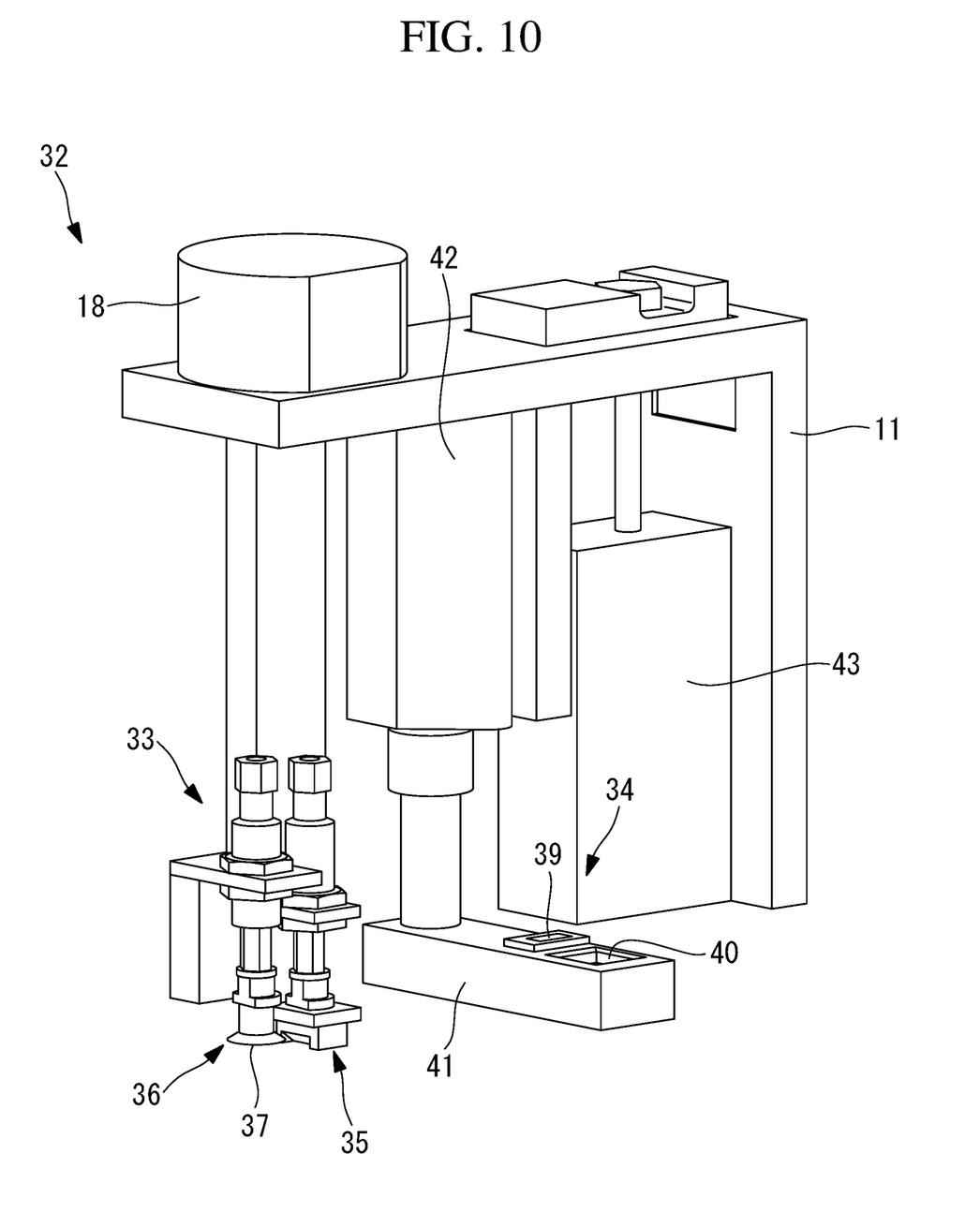
FIG. 10 is a perspective view showing a hand for connector connection according to a second embodiment of the present invention.

The hand for connector connection 32 according to this embodiment includes, as shown in FIG. 10, the mounting section 18 mountable on the hand base 11 by the ATC, a work gripping section 33 that grips the work W, and a work positioning section 34 that positions the work W.

Figure 11:
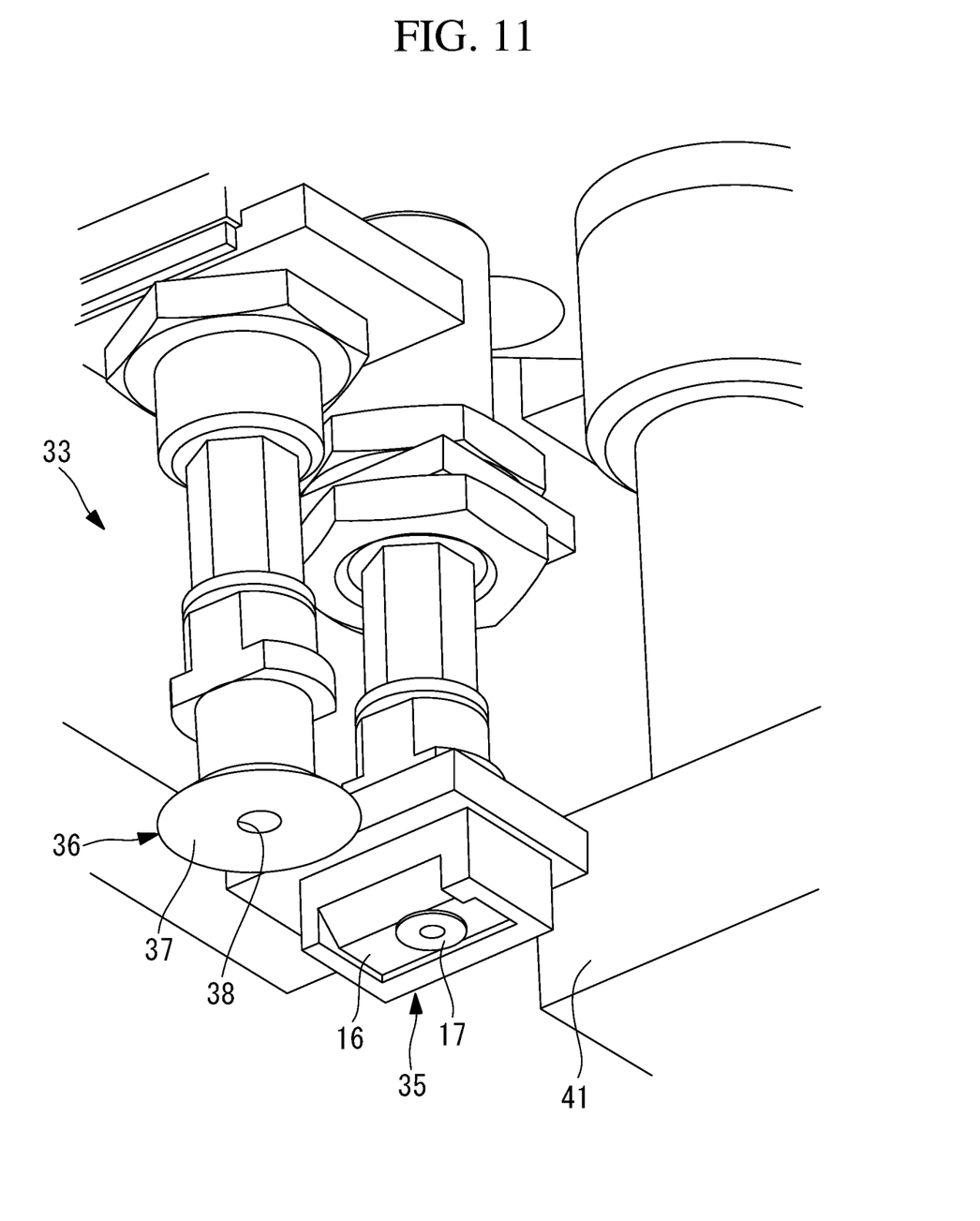
FIG. 11 is a perspective view showing a gripping section of the hand for connector connection shown in FIG. 10.

In this embodiment, the work gripping section 33 includes, as shown in FIG. 11, a first sucking section (a second gripping section) 35 that sucks the back surface of the first connector 6 and a second sucking section (a first gripping section) 36 that sucks the back surface of the main body component 4. The structure of the first sucking section 35 is the same as the sucking section 13 in the hand system 1. The second sucking section 36 may include, in the center of a suction pad 37, a suction hole 38 to which a negative pressure is supplied.

The work positioning section 34 includes a positioning member 41 including a first recess (a first positioning section) 39 in which the first connector 6 is fit and a second recess (a second positioning section) 40 in which the projection 8 of the main body component 4 is fit, a clamp cylinder (a pressing section) 42 that moves the positioning member 41 along an axis and rotates the positioning member 41 around the axis, and a slide cylinder 43 that moves the clamp cylinder 42 in a direction along the axis. An inclined surface 40a expanding toward an opening of the second recess 40 is provided on an inner wall on a side of the second recess 40 away from the first recess 39.

Dimensions of the first connector 6 and the main body component 4 are set to dimensions with which a positional relation between the first connector 6 and the main body component 4 is a positional relation in a mounted state on the mount substrate 7 in a state in which the first connector 6 is fit in the first recess 39 and the projection 8 of the main body component 4 is sufficiently fit in the second recess 40.

With the hand for connector connection 32 according to this embodiment configured in this way, the back surface of the first connector 6 is sucked by the first sucking section 35 and the back surface of the main body component 4 is sucked by the second sucking section 36, whereby the work W is gripped. In this state, it is assumed that the first connector 6 and the projection 8 of the main body component 4 are gripped by the hand for connector connection 32 in a posture facing the vertical downward direction.

Figure 12:
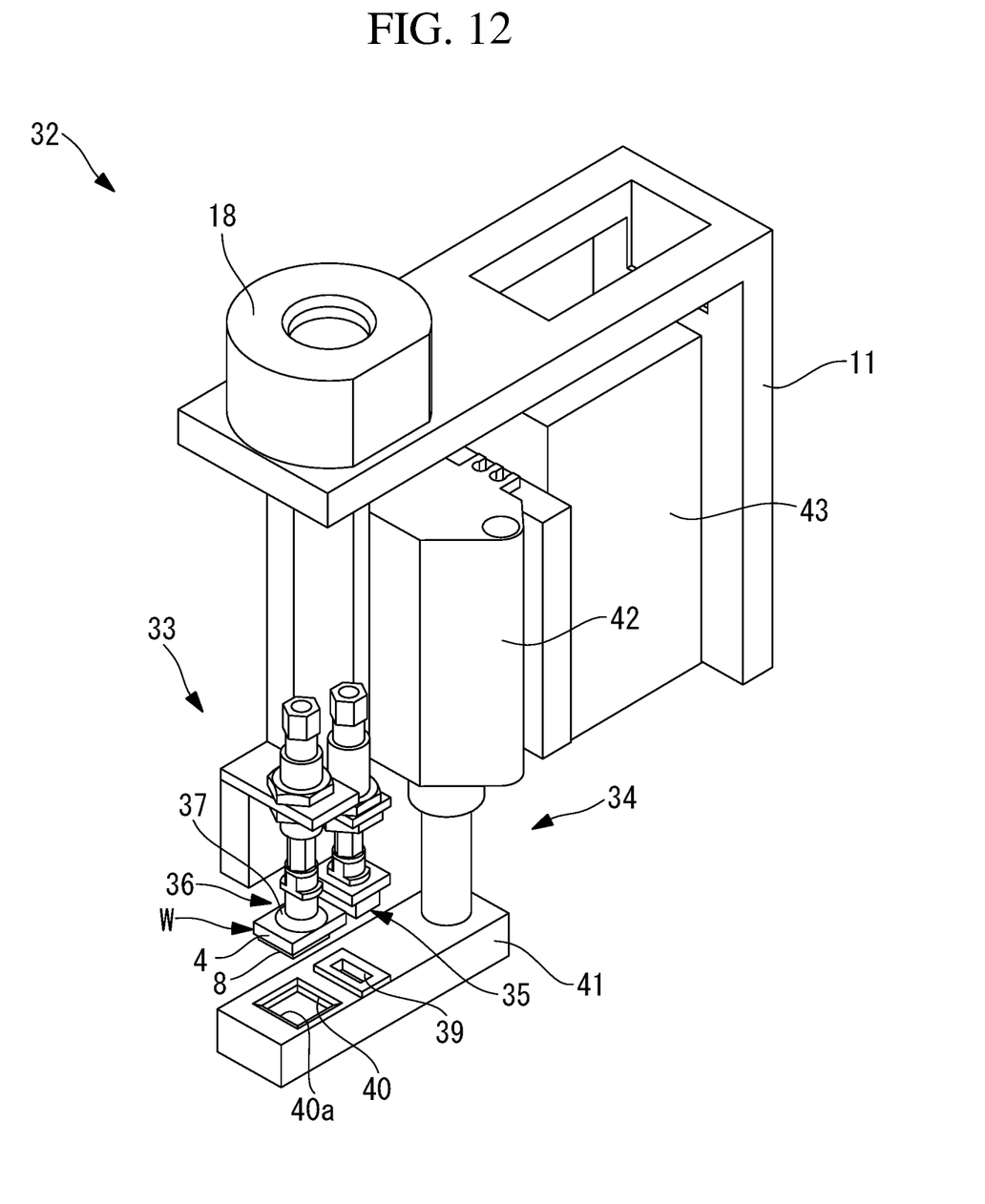
FIG. 12 is a perspective view for explaining operation for positioning work by the hand for connector connection shown in FIG. 10.
Figure 13:
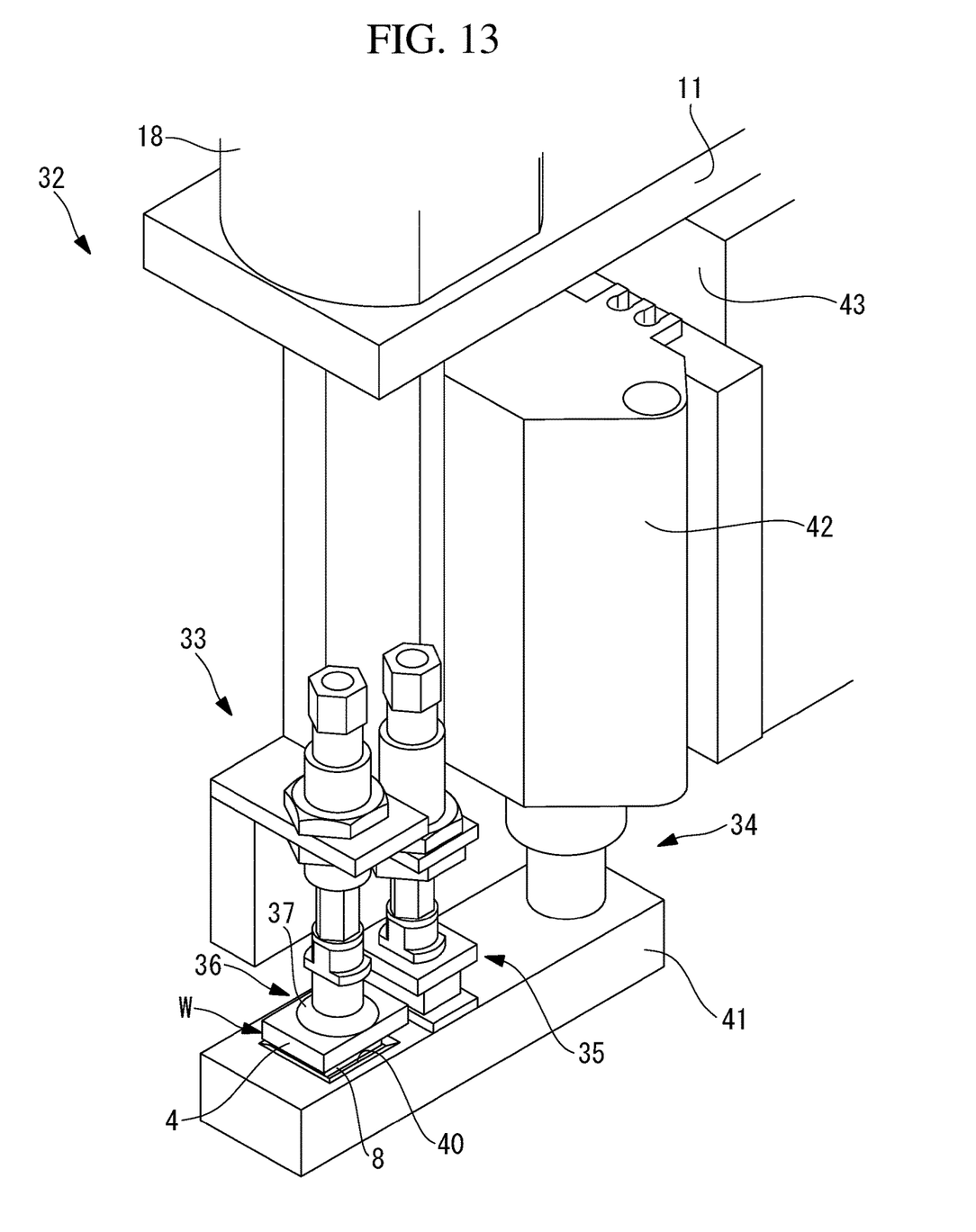
FIG. 13 is a perspective view for explaining the operation for positioning the work on the hand for connector connection following FIG. 12.

In this state, the positioning member 41 is moved to the bottom by the actuation of the slide cylinder 43 and the clamp cylinder 42. The positioning member 41 is rotated around the axis by the actuation of the clamp cylinder 42 to be disposed in the vertical downward direction of the work W as shown in FIG. 12. The positioning member 41 is raised by the actuation of the clamp cylinder 42, whereby, as shown in FIG. 13, the first connector 6 of the work W is fit in the first recess 39 and the projection 8 of the main body component 4 of the work W is fit in the second recess 40.

Since the inclined surface 40a is provided in the second recess 40, as the fitting of the projection 8 in the second recess 40 advances, the main body component 4 is rectified in a direction approaching the first connector 6 and the flexible board 5 bends. The positional relation between the main body component 4 and the first connector 6 is the positional relation in the mounted state on the mount substrate 7 at a point in time when the fitting of the projection 8 in the second recess 40 is completely performed. Therefore, after the sucked state by the first sucking section 35 and the second sucking section 36 is once stopped, by sucking the first connector 6 and the main body component 4 again, it is possible to grip, with the work gripping section 33, the work W having the positional relation in the mounted state on the mount substrate 7.

Thereafter, after the positioning member 41 is lowered in the vertical downward direction by the actuation of the clamp cylinder 42, the positioning member 41 is rotated around the axis and retracted from below the work W by the actuation of the clamp cylinder 42. Further, the positioning member 41 is moved to the top by the actuation of the clamp cylinder 42 and the slide cylinder 43. Consequently, in the same manner as shown in FIG. 9, the work W gripped by the work gripping section 33 can be mounted on the mount substrate 7 without being hindered by the positioning member 41.

Note that, in this embodiment, a flat inclined surface is used as the inclined surface 40a. However, a curved inclined surface may be used instead of the flat inclined surface.

From the above-described embodiment, the following invention is derived.

An aspect of the present invention is a hand for connector connection, which grips a component including a main body component, a flexible board extending from the main body component, and a first connector disposed on the flexible board and connects the first connector to a second connector of a mount substrate. The hand for connector connection includes: a first gripping section that grips the main body component; and a second gripping section that grips the first connector. The second gripping section includes: a close contact surface brought into close contact with a back surface of the first connector; and a suction pad that starts suction of the back surface of the first connector in a position further projecting than the close contact surface and is contracted to a position where the suction pad is disposed flush with the close contact surface in a sucked state.

According to this aspect, the main body component is gripped by the first gripping section, the first connector is gripped by the second gripping section, and the first connector is pressed against and connected to the second connector of the mount substrate. In this case, when the second gripping section brings the suction pad into contact with the back surface of the first connector and starts the suction of the back surface of the first connector, the suction pad contracts with a suction force and draws the back surface of the first connector close to and brings the back surface into close contact with the close contact surface provided on the second gripping section.

The second gripping section grips the first connector with suction rather than gripping a side surface of the first connector. Consequently, it is possible to accurately grip the first connector irrespective of a shape error of an external shape of the first connector. The second gripping section supports the first connector with the close contact surface rather than the suction pad. Therefore, it is possible to make it easy to detect, with a force sensor, a force applied to the first connector when the first connector is connected to the second connector. Consequently, it is possible to easily hold the component including the first connector and the main body component connected by the flexible board and surely connect the first connector to the second connector of the mount substrate.

In the aspect, the hand for connector connection may include: a first positioning section that performs positioning of the suction pad of the second gripping section and the first connector, the back surface of which is sucked by the suction pad; and a second positioning section that, with respect to the first connector positioned by the first positioning section, bends the flexible board and performs positioning, in an interval direction, of the first connector and the main body component in attaching the first connector and the main body component to the mount substrate. The first gripping section and the second gripping section may grip the main body component and the first connector in a positioned state by the second positioning section.

With this configuration, the positioning of the suction pad and the first connector is performed by the first positioning section. The positioning in the interval direction of the first connector positioned by the first positioning section and the main body component is performed by the second positioning section. The first gripping section and the second gripping section grip the main body component and the first connector in the positioned state by the second positioning section. Consequently, it is possible to directly mount the main body component and the first connector in the positioned state on the mount substrate.

In the aspect, the main body component may be formed in a flat shape, and the second positioning section may include: a pressing section that presses the main body component in a thickness direction; and an inclined surface inclined in a direction approaching the first connector along an advancing direction of the pressing by the pressing section, an end face of the main body component being brought into contact with the inclined surface.

With this configuration, when the flat main body component is pressed in the thickness direction by the pressing section, the main body component is pressed in the direction approaching the first connector by the inclined surface with which the end face of the main body component is in contact. Consequently, the flexible board is bent and the first connector and the main body component are positioned in the interval direction by the second positioning section.

Another aspect of the present invention is a hand system including: the above described hand for connector connection; and a jig for positioning. The jig for positioning includes: a first positioning section that performs positioning of a suction pad of the second gripping section and the first connector, a back surface of which is sucked by the suction pad; and a second positioning section that, with respect to the first connector positioned by the first positioning section, bends the flexible board and performs positioning, in an interval direction, of the first connector and the main body component in attaching the first connector and the main body component to the mount substrate. The first gripping section and the second gripping section grip the main body component and the first connector in a positioned state by the second positioning section.

In the aspect, the main body component may be formed in a flat shape, and the second positioning section may include: a pressing section that presses the main body component in a thickness direction; and an inclined surface inclined in a direction approaching the first connector along an advancing direction of the pressing by the pressing section, an end face of the main body component being brought into contact with the inclined surface.

REFERENCE SIGNS LIST 1 hand system
2, 32 hand for connector connection (hand main body)
3 jig for positioning
4 main body component
5 flexible board
6 first connector
7 mount substrate
10 second connector
12 gripping section (first gripping section)
13 sucking section (second gripping section)
16 close contact surface
17 suction pad
20 cylinder for push-up (second positioning section)
21 parallel chuck (second positioning section)
22 connector positioning recess (first positioning section)
23 pressing section
24a, 40a inclined surface
35 first sucking section (second gripping section)
36 second sucking section (first gripping section)
39 first recess (first positioning section)
40 second recess (second positioning section)
42 clamp cylinder (pressing section)
W work (component)

The invention claimed is:

1. A hand for connector connection, which grips a component including a main body component, a flexible board extending from the main body component, and a first connector disposed on the flexible board and connects the first connector to a second connector of a mount substrate, the hand for connector connection comprising:
   a first gripping section that grips the main body component, the first gripping section comprising two claw sections operable to clamp the main body component in a width direction; and
   a second gripping section that grips the first connector, wherein the second gripping section includes:
   a close contact surface brought into close contact with a back surface of the first connector; and
   a suction pad that starts suction of the back surface of the first connector in a position further projecting than the close contact surface and is contracted to a position where the suction pad is disposed flush with the close contact surface in a sucked state.

2. The hand for connector connection according to claim 1, further comprising:
   a first positioning section that performs positioning of the suction pad of the second gripping section and the first connector, the back surface of which is sucked 5 by the suction pad; and
   a second positioning section that, with respect to the first connector positioned by the first positioning section, bends the flexible board and performs positioning, in an interval direction, of the first connector and the main body component in attaching the first connector and the main body component to the mount substrate, wherein
   the first gripping section and the second gripping section grip the main body component and the first connector in a positioned state by the second positioning section.

3. The hand for connector connection according to claim 2, wherein the main body component is formed in a flat shape, and the second positioning section includes:

a pressing section that presses the main body component in a thickness direction; and an inclined surface inclined in a direction approaching the first connector along an advancing direction of the pressing by the pressing section, an end face of the main body component being brought into contact with the inclined surface.

4. A hand system comprising:

a hand for connector connection, which grips a component including a main body component, a flexible board extending from the main body component, and a first connector disposed on the flexible board and connects the first connector to a second connector of a mount substrate;

a jig for positioning;

wherein the hand for connector connection comprises:
- a first gripping section that grips the main body component;
- a second gripping section that grips the first connector, wherein the second gripping section includes:
  - a close contact surface brought into close contact with a back surface of the first connector; and
  - a suction pad that starts suction of the back surface of the first connector in a position further projecting than the close contact surface and is contracted to a position where the suction pad is disposed flush with the close contact surface in a sucked state;

wherein the jig for positioning includes:
- a first positioning section that performs positioning of a suction pad of the second gripping section and the first connector, a back surface of which is sucked by the suction pad; and
- a second positioning section that, with respect to the first connector positioned by the first positioning section, bends the flexible board and performs positioning, in an interval direction, of the first connector and the main body component in attaching the first connector and the main body component to the mount substrate; and wherein the first gripping section and the second gripping section grip the main body component and the first connector in a positioned state by the second positioning section.

5. The hand system according to claim 4, wherein the main body component is formed in a flat shape, and the second positioning section includes:
- a pressing section that presses the main body component in a thickness direction; and
- an inclined surface inclined in a direction approaching the first connector along an advancing direction of the pressing by the pressing section, an end face of the main body component being brought into contact with the inclined surface.

6. A hand for connector connection, which grips a component including a main body component, a flexible board extending from the main body component, and a first connector disposed on the flexible board and connects the first connector to a second connector of a mount substrate, the hand for connector connection comprising:
- a first gripping section that grips the main body component;
- a second gripping section that grips the first connector, wherein the second gripping section includes:
  - a close contact surface brought into close contact with a back surface of the first connector; and
  - a suction pad that starts suction of the back surface of the first connector in a position further projecting than the close contact surface and is contracted to a position where the suction pad is disposed flush with the close contact surface in a sucked state;
- a first positioning section that performs positioning of the suction pad of the second gripping section and the first connector, the back surface of which is sucked by the suction pad; and
- a second positioning section that, with respect to the first connector positioned by the first positioning section, bends the flexible board and performs positioning, in an interval direction, of the first connector and the main body component in attaching the first connector and the main body component to the mount substrate, wherein the first gripping section and the second gripping section grip the main body component and the first connector in a positioned state by the second positioning section.

7. The hand for connector connection according to claim 6, wherein the main body component is formed in a flat shape, and the second positioning section includes:
- a pressing section that presses the main body component in a thickness direction; and
- an inclined surface inclined in a direction approaching the first connector along an advancing direction of the pressing by the pressing section, an end face of the main body component being brought into contact with the inclined surface.

* * * * *